United States Patent [19]

Stone

[11] 3,820,249

[45] June 28, 1974

[54] SELF-GRIPPING LEVEL

[76] Inventor: Theodore M. Stone, 1130 Wellwood Ave., Beaumont, Calif. 92223

[22] Filed: Oct. 16, 1972

[21] Appl. No.: 297,893

[52] U.S. Cl............. 33/347, 33/382, 33/390
[51] Int. Cl............................. G01c 9/28
[58] Field of Search........... 33/332, 347, 343, 370, 33/371, 372, 373, 88, 382, DIG. 1; 335/303

[56] References Cited
UNITED STATES PATENTS

| 312,266 | 2/1885 | Gurley | 33/373 |
| 2,959,832 | 11/1960 | Baermann | 335/303 |
| 3,435,533 | 4/1969 | Whitfield | 33/347 |

FOREIGN PATENTS OR APPLICATIONS

| 1,934,717 | 2/1970 | Germany | 33/347 |

Primary Examiner—William D. Martin, Jr.
Assistant Examiner—Charles E. Phillips
Attorney, Agent, or Firm—John H. Crowe

[57] ABSTRACT

An ironworker's spirit level having a pair of flat, equally sized rectangular members hinged together along adjacent sides to turn about a common axis. The two rectangular members have front surfaces which fold together about the hinge axis and there are a pair of strips of magnetic material mounted in receptive grooves near the outer edges of the surfaces of the plate-like members so as to come together when these members are folded to a closed position. The strips of magnetic material permit the spirit level to be affixed to an upright pipe in parallel relationship to the axis of the pipe so that the tool can be held in position while the pipe is adjusted for verticality. Behind the upper front corner of one of the plate-like members a bulls-eye level is fixed in position so as to be readable from above. The tool can thus be installed on a pipe by means of its magnetic strips and the pipe can then be adjusted to the vertical position by observance of the bulls-eye level. Bubble vials of conventional type can be mounted in appropriate openings in one of the plate-like members in, for example, longitudinal, transverse, and 45° angular relationship with that member. Also, appropriate window openings can be cut in the other plate-like member to permit reading of the bubble vials from either side of the spirit level when it is installed for use on the job.

2 Claims, 4 Drawing Figures

SELF-GRIPPING LEVEL

BACKGROUND OF THE INVENTION

This invention relates generally to spirit levels for use in the trades, and more particularly to such a level of adjustable, self-gripping character, for use on ferromagnetic structural elements.

It has heretofore been difficult for workers to positionally adjust iron, steel, or other ferromagnetic members, particularly tubular members such as pipes. When setting tubular fence posts, for instance, it has been necessary to check the verticality of the member by eye, or use a time-consuming trial-and-error method of plumbing the member with a spirit level of conventional type having a tubular bubble vial. Such a bubble vial can indicate verticality in one plane, but has to be moved around the outer surface of the member to determine whether it is vertical in other planes as well. This manner of adjusting the verticality of a post is tedious and time-consuming. Additionally, once the vertical position is achieved, it is difficult to maintain during the subsequent anchoring operation. A worker has only two hands, and he cannot adjust the verticality of a post and set, or anchor, it at the same time. Accordingly, it is necessary to check the verticality of the post during the post-setting operation, and this adds considerably to the time consumption and difficulty of the overall operation.

A great deal of the tedium and aggravating slowness of installing vertical members would be eliminated by the provision of some means to permit the worker to quickly bring the member to a vertical position and maintain it thereat while it is being set or anchored, thus leaving his hands free to do the necessary work of fixing the member in position. To date, no one, to my knowledge, has come up with any such means of accomplishing this highly desirable result.

SUMMARY OF THE INVENTION

I have now provided, in the unique folding spirit level of this invention, a compact, inexpensive tool for use by ironworkers, and others responsible for the installation of vertical iron and steel members, which greatly reduces the time required for fixing the members in vertical position and anchoring them in place, as well as simplifying this procedure, and overcoming the tedium of conventional ways heretofore employed of accomplishing the same result. The spirit level tool is of extremely simple construction, comprising, in its preferred form, a pair of hinged rectangular plates with strips of magnetic material fixedly secured along their outer edges. These plates are of substantially equal size, and hinged at their inner side edges so as to swing back and forth between a folded position, and positions of angular separation adequate to permit their attachment to pipes, or other members, of varying dimensions. The strips of magnetic material are countersunk in groove-like depressions near the outer edges of the plate-like members so as to come into contact when the spirit level is folded to its closed position.

Preferably, my novel spirit level has a bulls-eye bubble vial affixed behind the upper, outer corner of one of its plate-like members, so as to be readable from above to indicate the deviation from verticality of any upright member on which the level is positioned. Preferably, but not necessarily, one of the plate-like members has cutouts in which are mounted conventional bubble vials disposed longitudinally, transversely, and at an angle (for example 45°), with respect to the axis of that member. The other plate-like member can, again preferably, have cutout windows to permit observation of the bubble vials from the opposite side of the tool when it is installed in positions making reading from the bubble vial side difficult.

The manner of use of my novel spirit level tool is the ultimate in simplicity. Briefly, the tool is simply folded against the side of an upright pipe, or other member to be installed in vertical position, so that the magnetic strips contact its side walls for their full lengths. These strips are sufficiently narrow that such contact assures substantially parallel relationship between the tool axis and the axis of the upright member, whereby the bulls-eye bubble vial gives a true indication of verticality of the upright member. Once the level is positioned on the upright member, it will remain there by virtue of the magnetic attraction between its magnetic strips and the metal walls of of said member. Obviously, the tool is designed only for use on upright members constructed of materials to which it is magnetically attractive. Once the tool is fixed to the upright member, it will be apparent that the worker's hands are free to do whatever is necessary to fix, or anchor, that member in position, which he can do while keeping an eye on the bulls-eye bubble vial to see that verticality of the member is maintained during this procedure. After the job is finished, he need only pull the tool away from the upright member, fold it and place it neatly in his pocket or other out-of-the-way place.

It will thus be apparent that iron or steel vertical members can be installed easily, quickly and efficiently, through the use of my novel spirit level, and without the aggravating tedium and costly slowness of doing this job in the conventional manner discussed above. As a result of its folding character, my novel spirit level tool can be versatilely used on upright members of a variety of shapes and sizes, since its magnetic strips assure attachment of the tool in axially parallel relationship with the member (so long as said member has surface characteristics consistent with such attachment), regardless of its cross-sectional size. The magnetic strips will insure against slippage of the tool out of position, or out of the worker's hands, an additional advantage where such work is conducted on high buildings, bridges, or the like, where dropping of the tool could lead to injury to persons, damage or destruction of property, or loss of the tool. The bulls-eye bubble vial makes determination of the verticality of the member a simple matter and eliminates the necessity common to all previous methods of determining verticality by employing conventional spirit levels at more than one position around the member in a trial-and-error method of bringing the member to vertical orientation.

It is thus a principal object of the present invention to provide compact, inexpensive spirit level means self-attachable to a ferromagnetic upright member and usable to permit a worker to quickly bring that member to vertical relationship and maintain it thereat while he sets, or anchors, it in position.

It is another object of the invention to provide such means versatilely suitable for use on upright members of a variety of sizes and shapes.

Other objects, features and advantages of the invention will become apparent in the light of subsequent disclosures herein.

DESCRIPTION OF THE PREFERRED EMBODIMENT

Figure 1:
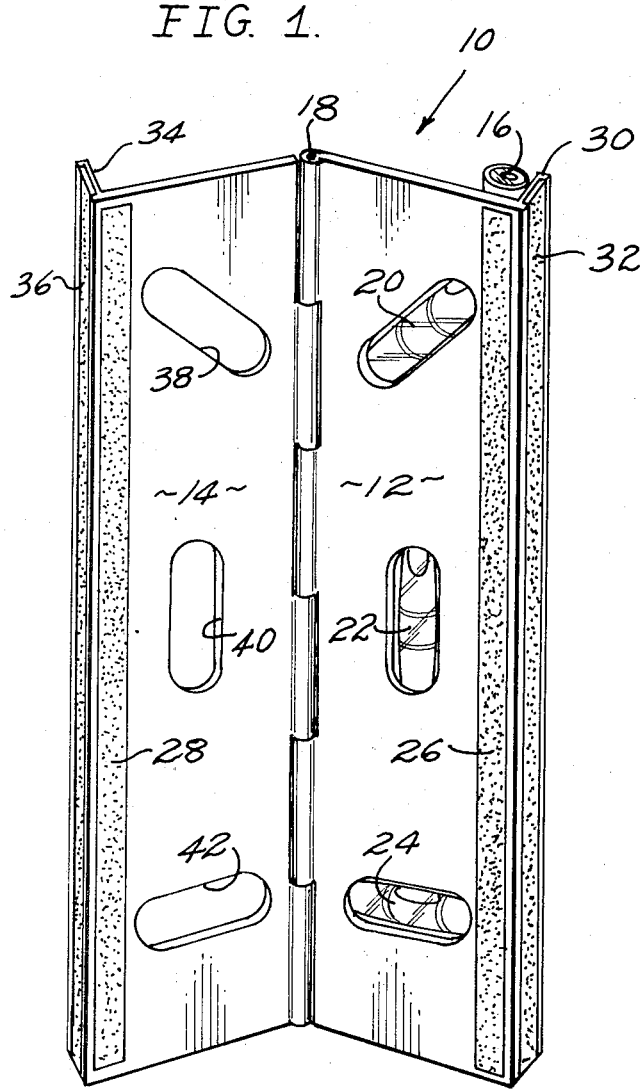
FIG. 1 is a perspective view of a preferred embodiment of the spirit level of this invention.
Figure 2:
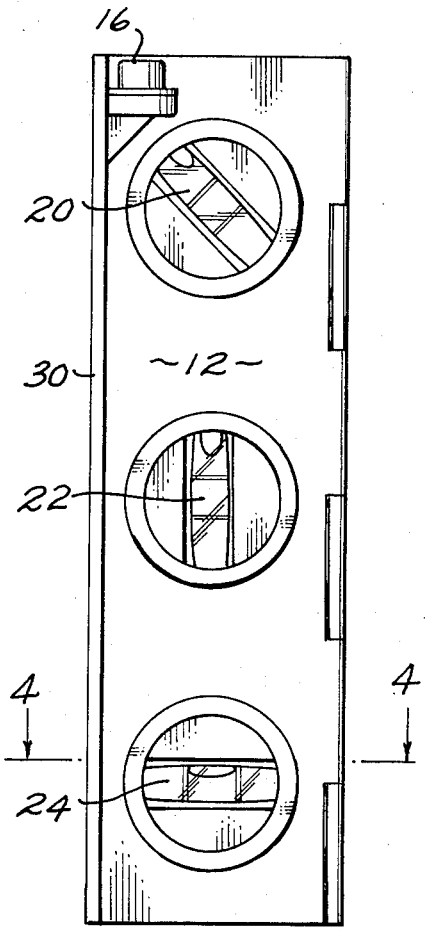
FIG. 2 is a side view of the tool, in folded position, taken from the right side of the tool as seen in FIG. 1.
Figure 4:
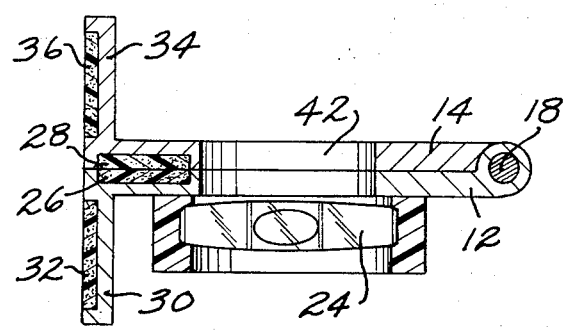
FIG. 4 is an enlarged transverse section of the folded tool, taken along line 4—4 of FIG. 2.
Figure 3:
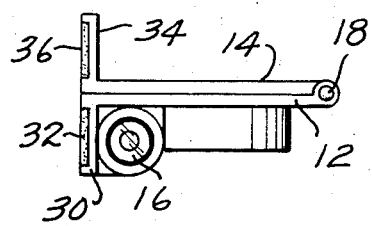
FIG. 3 is a top view of the folded tool.

Considering now the drawing in greater detail, there is shown generally at 10 a spirit level tool of preferred design in accordance with this invention. Spirit level tool 10 comprises a pair of flat, rectangular members 12 and 14, of a substantially nonmagnetizable material, such as aluminum, hinged at adjacent sides to rotate about a common axis 18. The flat members 12 and 14 have recesses in their forward faces, near their outer edges, adapted to receive a pair of magnetic strips 26 and 28, respectively. Strips 26 and 28 are sized to fit snugly within said recesses and are fixedly secured in position by suitable means, such as by means of an epoxy adhesive. Various adhesives of this type are known to those skilled in the art, and are readily available on the market. The magnetic strips are flexible strips of a suitable plastic impregnated with finely divided particles of magnetized iron or an iron alloy. These strips are of essentially permanent character and are available commercially from various sources, typical of which is Magnet Sales Co., of Los Angeles.

Fixedly secured to the back of flat member 12, behind its upper, outer corner, is a bulls-eye level 16. Mounted in suitable openings in flat member 12 are three vertically spaced spirit levels, 20, 22 and 24. Spirit level 20, at the top, is set at a 45° angle with the longitudinal axis of member 12. Spirit levels 22 and 24 are set longitudinally and transversely relative to this longitudinal axis. Flat member 14 has three openings 38, 40 and 42, positioned to permit viewing of spirit levels 20, 22 and 24, respectively, when tool 10 is affixed in a position making it difficult or impossible to directly observe any of these spirit levels. Extending backwardly from the outer edges of flat members 12 and 14 are a pair of flanges 30 and 34, respectively. Flanges 30 and 34 have receptive grooves for a pair of magnetic strips 32 and 36, respectively, which are fixedly secured in the same manner as the magnetic strips 26 and 28 are secured in the grooves in the faces of flat members 12 and 14.

As will, it is believed, be apparent, spirit level 10 is primarily suitable for use on iron and steel members, preferably tubular members which are to be anchored or fixed in vertical positions. It can easily be attached to such a member, with magnetic strips 26 and 28 positioned parallel to the axis of said member, after which the verticality of the member can be easily adjusted by observation of the bulls-eye level, while the hands are free to do the necessary work of fixing said member in vertical position. When the job is completed, the tool is easily pulled away from the member, and folded for slipping it into the pocket, or other out-of-the-way place, until it is needed again.

Those skilled in the art will appreciate that the presence of bubble vials 20, 22 and 24, and flanges 30 and 34, with their magnetic strips, suit the tool for use on members, and structures, of a great variety of sizes, shapes, and degree of accessibility.

While the novel spirit level tool of this invention has been herein described and illustrated in what is considered to be a preferred embodiment, it will be understood by those skilled in the art that various departures may be made therefrom within the scope of the invention. Some of these departures have already been mentioned, and others will occur to those skilled in the art in the light of present teachings. For example, the spirit level need not have all of the bubble vials shown in the drawing, only one being sufficient for purposes of my invention. Preferably this one should be the bulls-eye level, since that level is necessary for the principal purpose of the tool, which is to permit the setting of vertical members in position with minimal time and difficulty. Furthermore, the flanges 30 and 34 can be omitted, since these merely add versatility to the basic tool. In summary, the scope of my invention extends to all variant forms thereof encompassed by the language of the following claims.

I claim:

1. Spirit level means comprising a pair of plate-like members hinged together so as to fold and unfold about a common axis, said plate-like members being formed from a substantially nonmagnetizable material and being characterized by the presence of magnetic means on their front surfaces shaped and positioned to fit against the sides of a suitable elongate member and hold said plate-like members against the latter when it is formed of a ferromagnetic material, said magnetic means being two strips of a material of flexible, magnetized character countersunk in said plate-like members and fixedly secured in position by suitable fastening means, whereby said spirit level means is adjustable to fit members of varying sizes and cross-sectional shapes, and self-gripping in the sense that it remains in position on said members of ferromagnetic construction when placed thereon;

said plate-like members being of generally rectangular shape and hinged together along adjacent side edges, and said magnetic strips being situated near the edges remote from the hinged edges of said front surfaces of said plate-like members so as to approach each other when these members are folded together in embrace of said elongate member;

said magnetic strips being positioned to meet in flush contact when said plate-like members are folded together about their common axis, and said spirit level means having a bulls-eye level secured in position behind the upper corner of one of said plate-like members remote from the hinged edge of that member so as to be readable from a position above the member, whereby said spirit level means can serve to indicate the verticality of said elongate member when the latter is being installed in a vertical position;

said spirit level means having three bubble vials mounted in three openings in three suitable locations in a first one of said plate-like members, said bubble vials being respectively disposed longitudinally of, transversely of, and at a 45° angle with respect to the axis of the plate-like member; and the second of the plate-like members of said spirit level means having window openings corresponding positionally to the openings in which said bubble vials are mounted in the first one of the plate-like members to permit reading of said vials from either side of said spirit level means when the latter is positioned for use at a job side.

2. Spirit level means in accordance with claim 1 having a pair of flanges integral with said plate-like members and extending backwardly from their outer edges at 90° angles from said members, said flanges having grooves in which are fixedly secured two strips of magnetic material which serve as magnetic gripping strips facing 90° respectively from the magnetic strips in the forward faces of said plate-like members to permit greater versatility of use of said spirit level means in ferromagnetic structural environments.

* * * * *